United States Patent [19]

Frenkel et al.

[11] Patent Number: 4,813,756

[45] Date of Patent: Mar. 21, 1989

[54] ETALON FILTERS FOR OPTICAL CHANNEL SELECTION IN WAVELENGTH DIVISION MULTIPLEXED FIBER SYSTEMS

[75] Inventors: Anatoly Frenkel, Somerville; Chinlon Lin, Holmdel Township, Monmouth County, both of N.J.

[73] Assignee: Bell Communications Research, Inc., Livingston, N.J.

[21] Appl. No.: 148,071

[22] Filed: Jan. 25, 1988

[51] Int. Cl.$^4$ .................................................. G02B 6/32
[52] U.S. Cl. ................................. 350/96.18; 350/311
[58] Field of Search ............... 350/96.15, 96.16, 96.18, 350/96.19, 96.21, 311, 316, 317, 318; 372/25

[56] References Cited

U.S. PATENT DOCUMENTS

| | | | |
|---|---|---|---|
| 3,902,130 | 8/1975 | Pike | 372/25 X |
| 4,671,604 | 6/1987 | Soref | 350/96.18 X |

OTHER PUBLICATIONS

"A Conceptional Design on Optical Frequency-Division-Multiplexing Distribution Systems with Optical Tunable Filters", Hiromu Toba, Kyo Inque & Kiyoshi Nosu, *IEEE Journal on Selected Areas in Communications*, vol. SAC-4, No. 9, Dec. 1986.
"Optical FDM Transmission Technique", Kiyoshi Nosu, Hiromu Toba, and Katsushi Iwashita, *Journal of Lightwave Technology*, vol. LT-5, No. 9, Sep. 1987.
"Tunable Optical Multi/Demultiplexer for Optical FDM Transmission System", K. Inque, H. Toba & K. Nosu, *Electronics Letters*, Apr. 25, 1985, vol. 21, No. 9.
"Electro-Optically Tunable, Narrowband Ti:LiNbO$_3$ Wavelength Filter", F. Heismann, L. L. Buhl, R. C. Alferness, *Electronic Letters*, May 21, 1987, vol. 23, No. 11.
"Wavelength-Selective Filters for Single-Mode Fiber WDM Systems Using Fabry-Perot Interferometers", Stephen R. Mallinson, *Applied Optics*, vol. 26, No. 3, Feb. 1, 1987.
"Pigtailed High-Finesse Tunable Fibre Fabry-Perot Interferometers with Large, Medium and Small Free Spectral Ranges", R. Glavina, S. Cucchi, G. L. Sicuranza, *Electronics Letters*, Jul. 16, 1987, vol. 23, No. 15.
"Crosstalk Limits of Fabry-Perot Demultiplexers", S. R. Mallinson, *Electronic Letters*, Aug. 15, 1985, vol. 21, No. 17.
"Ultrahigh Finesse Fiber Fabry-Perot Interferometers", J. Stone and D. Marcuse, *Journal of Lightwave Technology*, vol. LT-4, No. 4, Apr. 1986.

*Primary Examiner*—John D. Lee
*Assistant Examiner*—Phan T. Heartney
*Attorney, Agent, or Firm*—James W. Falk; John T. Peoples

[57] ABSTRACT

Filter arrangements (400,500,600) are disclosed for tunable channel selection in optical wavelength division multiplexed systems. Each filter arrangement has an etalon device (e.g. 401-403) as a simple, compact, in-line component which is rotatably adapted for interposing between the ends of fiber optic cables for interconnecting the cables. An optical beam emanating from a free end of each cable end is focused and directed to the etalon device by a collimated lensed connector (e.g. 411). Identical etalon devices may be stacked and ganged for rotation in unison to increase the number of system channels that may be propagated. Non-identical etalon devices may be stacked and made independently rotatable to increase the free spectral range of the system.

12 Claims, 3 Drawing Sheets

ETALON FILTERS FOR OPTICAL CHANNEL SELECTION IN WAVELENGTH DIVISION MULTIPLEXED FIBER SYSTEMS

FIELD OF THE INVENTION

This invention relates generally to an optical fiber communication system and, in particular, to in-line, angle-tuned etalon filter arrangements for optical channel selection in high-density wavelength division multiplexed (WDM) systems.

BACKGROUND OF THE INVENTION

In a typical optical WDM distribution system, a plurality of multiplexed signals are propagated over an optical medium to each receiver in the system and one of these signals is selected for detection within the receiver. The selection is often accomplished by interposing a wavelength sensitive optical filter between the medium and each receiver. In more specific terms, for instance, optical signals from each of N different optical signal generators with wavelengths of $\phi_1, \phi_2, \ldots, \phi_N$, respectively, are multiplexed and propagated over a system fiber connecting the various receivers. A given filter passes one of the wavelengths, say $\phi_i$, from the composite set of wavelengths present on the fiber through to the associated receiver. For enhanced performance, the filter may be tunable so that a particular wavelength from the prescribed set may be optionally seleted. Such a tunable channel selection technique is important in order to increase the information capacity and system flexibility of short-haul communication systems such as in the local telephone loop wherein the number of multiplexed signals can range into the hundreds.

Conventional WDM filtering techniques have utilized dielectric-coated, optical interference filters or diffraction gratings. Interference filters usually have limited spectral resolution and are not tunable, thereby restricting their use to systems with a few number of channels. Diffraction gratings offer better spectral resolution, but because they are relatively bulky, lousy and expensive, they are not viable for in-line, short-haul applications.

Several, more recent alternatives have been proposed. Representative of these alternatives to tunable channel selection, for instance, is the article "Tunable Optical Multi/Demultiplexer for Optical FDM Transmission System", authored by Inoue et al and published in the *Electronics Letters*, vol. 21, pp. 387–389 (1985). As reported, a Mach-Zender interferometer is proposed as a tunable optical filter with very fine spectral resolution, but the so-called finesse is only on the order of 2 and this severely limits the number of channels that may be filtered. Moreover, the configuration is rather complex in that two directional couplers, a piezoelectric phase shifter, and polarization-holding fibers are required. Another article, entitled "Electro-Optically Tunable, Narrowband Ti:LiNbO$_3$ Wavelength Filter", by Heismann et al as published in the *Electronic Letters*, vol. 23, pp. 572–574 (1987), reports on a tunable filter, but it has limitations in that high operating voltages are required and the tuning range is narrow.

Also, different types of Fabry-Perot interferometers have been proposed as a tunable filter for optical channel selection. Representative of these proposals are the following two articles: "WavelengthSelective Filters for Single-Mode Fiber WDM Systems Using Fabry-Perot Interferometers" authored by S. R. Mallinson and appearing in *Applied Optics*, 26, pp. 430–436 (1987); and "Pigtailed High-Finesse Tunable Fiber Fabry-Perot Interferometers with Large, Medium and Small Free Spectral Ranges" authored by J. Stone et al and appearing in *Electronics Letters*, Vol. 23, pp. 781,783 (1987). These techniques involve difficult alignment procedures to achieve high parallelism of interferometer surfaces. Furthermore, optical wavelength tuning requires very accurate linear movement (on the order of much less than one micron) usually using a piezoelectric element, and very high thermal stability, especially in a real field environment.

In general, the recent alternatives are deficient for tunable channel selection, short-haul applications because of one or more of the following limitations: require highly accurate adjustment and positioning; reflection of unselected signals may introduce source and system noise; cannot be utilized inline; limited spectral resolution; small finesse; high voltages required; difficult alignment and tunability mechanism; complexity; bulkiness; lousy; and expensive.

SUMMARY OF THE INVENTION

These and other shortcomings and limitations are obviated, in accordance with the present invention, by providing an angle-tuned etalon-based structure which is passive, simple and compact so it may be used for in-line applications.

In one embodiment of the present invention, a device for interconnecting two optical fibers includes: means for registering the free ends of the fibers and for collimating the optical beam emanating from the fiber ends; and a single etalon, rotatably adapted, for receiving the collimated energy and for selectively transmitting optical signal between the fibers.

Another embodiment includes replacing the single etalon with a multiplicity of identical etalons which may be stacked and ganged for rotation in unison. This arrangement increases the number of channels that may be propagated over the system. Still another embodiment utilizes numerous stacked but non-identical etalons in place of the single etalon. In this arrangement, the etalons are independently rotatable, thereby increasing the free spectral range of the system.

DETAILED DESCRIPTION

Overview

Figure 1:
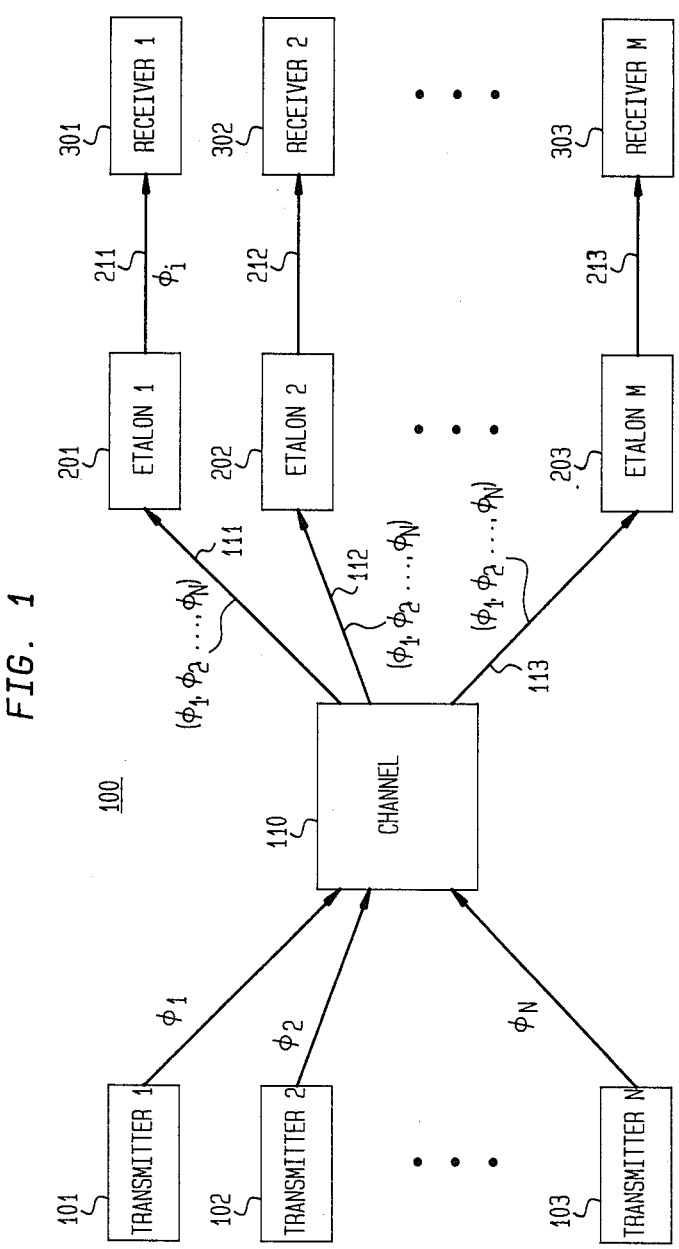
FIG. 1 depicts, in block diagram form, the optical communication system under consideration in accordance with the present invention.

The general multiple transmitter-receiver system 100 under consideration is depicted in block diagram form in FIG. 1. In system 100, N transmitters 101,102, ..., 103 are arranged to communicate with M receivers 301,302, ..., 303 over interposed optical channel 110. In the embodiment depicted in FIG. 1, channel 110 is a star coupler which serves to buffer and multiplex the output signals of the various transmitters and propagate the multiplexed signals to the various receivers. An exemplary star coupler building block component is Model ACS 11 as provided by JDS Optics Inc. of Ottawa, Canada. Each transmitter 101, 102 or 103 generally transmits an optical signal at a wavelength designated as $\phi_i$, i=1, 2, ..., N, respectively. For instance, transmitter 101 propagates a signal having optical wavelength $\phi_1$. In one illustrative embodiment, the transmitters are distributed feedback (DFB) laser diodes operating in the 1550 nm region and channel 110 comprises any commercially available single-mode fiber supporting propagation in this region. In many applications, the wavelengths between adjacent signals are separated by a constant $\Delta\phi$, that is, $\phi_{i+1}-\phi_i=\Delta\phi$ for i=1,2, ... N−1.

Signals are delivered from main channel 110 via fiber paths 111,112, ..., 113, which, in turn, feed etalon arrangements 201,201, ..., 203, respectively. The composite signal on channel 110 due to all the propagating signals has been shown as $(\phi_1, \phi_2, ..., \phi_N)$ as it appears on each of the individual paths. Each etalon arrangement has an output which serves as an input to an associated receiver. For instance, etalon 201 is coupled to receiver 302 via interposed fiber path 211. In one illustrative embodiment, each receiver 301, 302 or 303 is a direct detection type receiver well-known in the art.

In general, a transmitter having wavelength $\phi_i$ propagates its signal to one of the M receivers, so the function of the etalon arrangement associated with that particular receiver is to filter the wavelength $\phi_i$ from the composite signal on channel 110. For instance, in FIG. 1, receiver 301 is shown as detecting wavelength $\phi_i$ as provided by etalon arrangement 201 over path 211.

Single Etalon Embodiment

Figure 2:
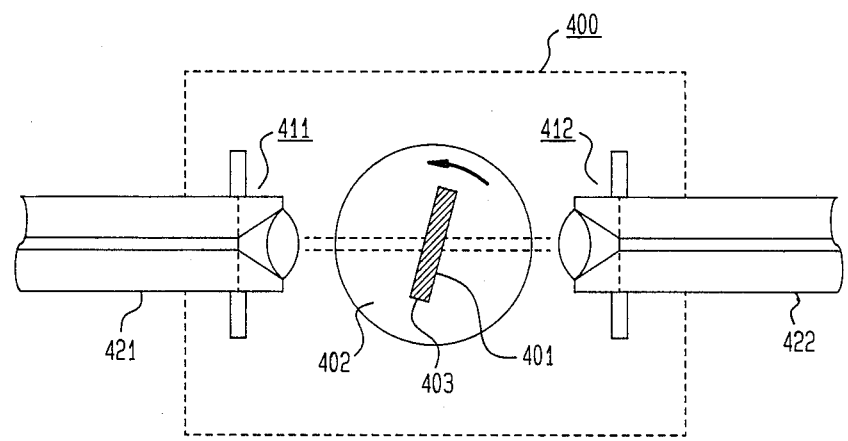
FIG. 2 is a pictorial diagram of a single, inline, fiber-coupled etalon filter arrangement in accordance with the present invention.

The basic building-block component for each etalon filter-arrangement 201,202, ..., 203 in FIG. 1 is an angle-tuned etaon device. FIG. 2 is a pictorial diagram of an in-line, fiber-coupled filter arrangement 400 comprising angle-tuned etalon device 401 and collimated beam lensed connector pair 411 and 412 coupling single-mode fiber ends 421 and 422, respectively to etalon 401. Etalon 401 is arranged for rotational movement (counter-clockwise arrow) to accomplish wavelength selection simply by angle tuning. For example, etalon 401 may be mounted in a swivel type holder (not shown) that encompasses circularly shaped etalon 401. Moreover, connectors 411 and 412 are used for collimating and refocusing the fiber beam into etalon chamber 402. Such connectors are commercially available as Lamdak single-mode fiber connectors provided by the Kodak Corp.

Figure 3:
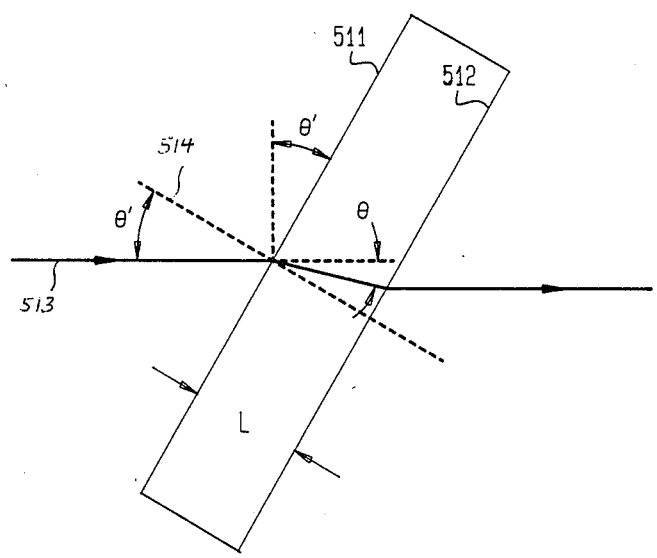
FIG. 3 is a pictorial representation of a single etalon device depicting design angles and the thickness dimension.

To derive information about the design parameters and therefore the performance characteristics of etalon 401, reference is made FIG. 3. The so-called internal angle of incidence $\theta$, which is related to the angle of rotation $\theta'$ ($\theta'$ is the acute angle between light beam 513 and line 514 normal to surfaces 511 and 512), corresponds to the optical channel signal with wavelength $\phi_i$ according to the relation $$\cos\theta = \frac{m\phi_i}{2nL} \quad (1)$$

where
m is an integer
n is the etalon index of refraction,
$\sin\theta = \sin\theta'/n$,
and L is the etalon thickness.

In equation (1), there are two unknowns, namely, m and L. To determine these values, the following procedure is used:

(i) A free spectral range ($F_R$) is set equal to or greater than the system wavelength range where ($\phi_{max}-\phi_{min}$), where $\phi_{max}$ and $\phi_{min}$ are the maximum and minimum wavelengths over which etalon 401 will be tuned. The value of m in equation (1) is determined from $$m = \left[\frac{\phi_{max}}{F_R}\right] \quad (2)$$

where . represents the integer part operator. The value determined via equation (2) is rounded down to insure that the value of $F_R(F_R=\phi_{max}/m)$ is such that $F_R \leq \phi_{max}-\phi_{min}$.

(ii) The thickness of the etalon is then given by $$L = \frac{m\phi_{max}}{2n}. \quad (3)$$

Once the thickness L and integer m have been determined, the minimum spacing or signal separation may then be obtained once two other parameters, namely, the minimum transmission coefficient ($T_{min}$) and the minimum acceptable level of crosstalk (K) are specified by the system designer. This separation is then given by $$\Delta\phi_{min} = \frac{\pi\phi_{max}}{Fm\sqrt{12K}}, \quad (4)$$

where F is the so-called finesse factor, $$F = \pi\sqrt{R_{max}}/(1-R_{max}), \quad (5)$$

where $R_{max}$ is the maximum reflectivity of etalon plates 511 and 512, $$R_{max} = 1 - A/(1-\sqrt{T_{min}}) \quad (6)$$

and where A is the coating absorption coefficient for plates 511 and 512 as determined by the coating manufacturing process.

In deriving equations (4)–(6), it has been presumed that surfaces or plates 511 and 512 are parallel and that the diameter of the beam emanating from connector 411 or 412 is small.

The maximum number of optical signal channels detectable with etalon 401 for the given and derived parameters then becomes $$N_{max} = \frac{\phi_{max} - \phi_{min}}{\Delta \phi_m} + 1.$$

Typical design values for solid etalon 401 utilizing a coating deposition technique to produce plates 511 and 512 are:

| Given | |
|---|---|
| $\phi_{min} =$ | 1510 nm |
| $\phi_{max} =$ | 1560 nm |
| $T_{min} =$ | 0.80 |
| $K =$ | 0.1 |
| $n =$ | 1.5 |
| $A =$ | 0.003 |
| Then | |
| $L =$ | 16.1 micron |
| $F_R =$ | 50.3 nm |
| $m =$ | 31 |
| $R_{min} =$ | 0.97 |
| $F =$ | 103 |
| $\Delta \phi_{min} =$ | 1.4 nm |
| and $N_{max} =$ | 36, | all for an operating region in the 1550 nm range. The diameter of each etalon plate 511 or 512 for an in-line application is typically no greater than 10 mm. Plates 511 and 512 are deposited on substrate 403, typically a silicon-type material. The tuning angle for tuning from one laser wavelength to the next ranges typically from 0.5 to 5 degrees depending on the optical channel spacing and angle $\theta$.

Multiple Etalons

The number of optical channels which can be simultaneously used with a single etalon arrangement may still be somewhat limited for certain applications. Limitations occur because all optical channels are constrained to be within one free spectral range. Also, the spectral spacing between channels is restricted due to the conflicting requirements of high optical throughput (which restricts the maximum reflectivity of etalon surfaces), and the minimum acceptable crosstalk (which requires maximization of the reflectivity of etalon surfaces). Improvements in the crosstalk performance, a significant decrease in the minimum channel spacing and an increase in the number of multiplexed channels can be effected with the use of multiple etalons. Two cases are considered, namely, ganged, identical etalons and stacked, non-identical, independently controlled etalons.

Figure 4:
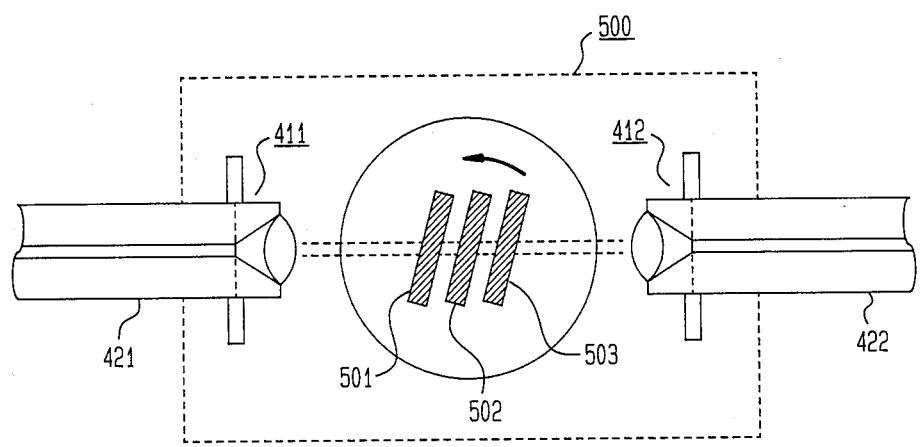
FIG. 4 is a pictorial representation of an inline, fiber-coupled etalon arrangement wherein etalons are stacked as ganged, parallel identical etalons.

The first case, as depicted by etalon arrangement 500 in FIG. 4, allows for a significant decrease in crosstalk and, therefore, decrease in the minimum optical channel spacing at the expense of increased transmission loss. The expression for the channel spacing is $$\Delta \phi_{min} = \frac{\pi \phi_{max}}{Fm \sqrt{12}} (K^{-\frac{1}{r}})$$

where r is the number of identical etalons 501, 502, . . . , 503 of FIG. 4. Moreover, if a single etalon has a maximum transmission $T_1$, then the transmission $T_R$ becomes $$T_R = (T_1)^r.$$

This technique still requires that all the channels be placed within one free spectral range as with a single etalon.

Figure 5:
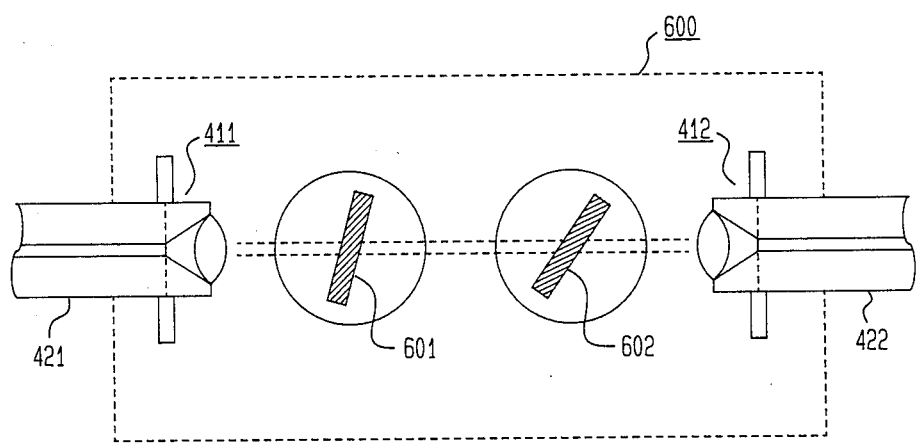
FIG. 5 is a pictorial representation of an inline, fiber-coupled etalon filter arrangement wherein non-identical etalons are stacked but independently controllable.

The second case, as depicted by etalon arrangement 600 in FIG. 5, allows for the use of etalons to expand the range of optical signals beyond the free spectral range of each individual etalon, that is, the composite free spectral range of the stacked, non-identical and independently controlled etalons is much greater than that of a single etalon. As depicted in FIG. 5, each etalon is arranged to be individually rotated for separate tuning. The design of such a stacked arrangement is complex and generally requires computer simulation and optimization. However, as an aid to the types of considerations that must be addressed in the design process, certain design criteria for two stacked but independently tunable etalons are presented.

First, the free spectral range of the etalons should not be a multiple of each other. This constraint results in the etalon thickness being expressed as:

$$L_1 = \frac{m_1 \phi_{max}}{2n}, \text{ and } L_2 = \frac{m_2 \phi_{max}}{2n}, \text{ where}$$

$m_1 \neq 2m_2 \neq 2m_1$.

Secondly, crosstalk may be reduced by choosing the optical channel spacing to be non-multiple to the free spectral ranges of both etalons.

Also, as in the above case, the increase of multiplexed capacity is achieved at the expense of a reduction in the optical throughput. Generally, the transmission parameters of the individual etalons should be multiplied to obtain the overall transmission loss presented by etalon arrangement 600.

It is to be understood that the above-described embodiments are simply illustrative of the application of the principles in accordance with the present invention. Other embodiments may be readily devised by those skilled in the art which may embody the principles in spirit and scope.

What is claimed is:

1. A device for interconnecting two optical fibers comprising
    means, coupled to the fibers, for registering the free ends of the fibers and for collimating optical energy propagating over the fibers, and
    mechanically rotatable etalon means, maintained in optical energy transfer relation with said registering and collimating means, for selectively transmitting optical energy between the fibers.

2. A device for linking first and second optical fibers comprising
    first and second collimated beam connectors for receiving and registering the terminating ends of the first and second fibers, respectively, and
    a mechanically rotatable etalon arrangement, interposed in optical energy transfer relationship between said connectors, for filtering optical energy transmitted by one of the fibers to the other one of the fibers.

3. The device recited in claim 2 wherein said mechanically rotatable etalon arrangement includes a single, solid core etalon filter and wherein said connectors and said filter are adapted to be substantially in-line with the fibers.

4. The device as recited in claim 2 wherein said mechanically rotatable etalon arrangement includes a cascade of etalon filters.

5. The device as recited in claim 4 wherein each of said etalon fibers is a solid core type etalon filter.

6. The device as recited in claim 2 wherein said mechanically rotatable etalon arrangement includes stacked, identical etalons ganged for rotation.

7. The device as recited in claim 2 wherein said mechanically rotatable etalon arrangement inludes stacked, non-identical etalons that are independently rotatable.

8. The device as recited in claim 2 wherein said arrangement is angle tunable.

9. An optical channel selection filter mounted for coupling two single mode optical fibers comprising
means for registering the free ends of the fibers and for focusing an optical signal present on the fibers into an optical beam, and
means, in energy transfer relation with said means for registering and focusing, for receiving and selectively filtering said beam, said means for receiving and filtering including a circular cross-section substrate having a coating deposited on the surfaces of said substrate, said surfaces formed substantially in parallel, said coating-substrate combination having predetermined transmsision and reflection characteristics, said means for receiving and filtering being mounted for mechanical rotation about an axis substantially transverse to said optical beam.

10. An optical channel selection filter mounted for coupling two single mode optical fibers comprising
means for registering the free ends of the fibers and for focusing an optical signal present on the fibers into an optical beam, and
means in energy transfer relation with said means for registering and focusing, for receiving and selectively filtering said beam, said means for receiving and filtering including a circular cross-section substrate having a coating deposited on the surfaces of said substrate, said surfaces formed substantially in parallel, said costing-substrate combination having predetermined transmission and reflection characteristics,
wherein said coating-substrate combination has a thickness of substantially $$L = \frac{m\phi_{max}}{2n}$$

where
n is the index of refraction of said combination, $$m = \left[ \frac{\phi_{max}}{F_R} \right]$$

with $\phi_{max}$ being the maximum wavelngth component of said beam and $F_R$ being the free spectral range.

11. The filter as recited in claim 10 having a diameter substantially the same as the diameter of a cable housing the fibers for in-line insertion.

12. The filter as recited in claim 11 wherein said coating-substrate combination is rotatably mounted to effect tuning.

* * * * *

UNITED STATES PATENT AND TRADEMARK OFFICE
CERTIFICATE OF CORRECTION

PATENT NO. : 4,813,756

DATED : March 21, 1989

INVENTOR(S) : Frenkel et al

It is certified that error appears in the above-identified patent and that said Letters Patent is hereby corrected as shown below:

Column 1, line 42, change "lousy" to --lossy--;

Column 2, line 22, change "lousy" to --lossy--.

Column 4, line 15, delete "where";

Column 4, line 20, in the equation, change "[" to --⌈--;

Column 4, line 20, in the equation, change "]" to --⌉--;

Column 4, line 25, change " . " to --⌈ . ⌉--;

Column 4, line 26, change "value determined" to --value of m determined--;

Column 4, line 28, change "$F_R \leq$" to --$F_R \geq$--;

UNITED STATES PATENT AND TRADEMARK OFFICE
CERTIFICATE OF CORRECTION

PATENT NO. : 4,813,756

DATED : March 21, 1989

INVENTOR(S) : Frenkel et al.

It is certified that error appears in the above-identified patent and that said Letters Patent is hereby corrected as shown below:

Column 7, line 5, change "fibers" to --filters--;

Column 7, line 11, change "inludes" to --includes--;

Column 7, line 29, change "transmsision" to --transmission--.

Column 8, line 24, in the equation, change "[" to --[--;

Column 8, line 24, in the equation, change "]" to --]--;

Column 8, line 26, change "wavelngth" to --wavelength--.

Signed and Sealed this

Sixth Day of October, 1992

*Attest:*

DOUGLAS B. COMER

*Attesting Officer*   Acting Commissioner of Patents and Trademarks